Dec. 11, 1945.　　　S. C. RAYBON　　　2,390,960
INTERNAL-COMBUSTION ENGINE
Filed March 16, 1944　　　7 Sheets-Sheet 1

S. C. Raybon
INVENTOR.

BY
ATTORNEYS.

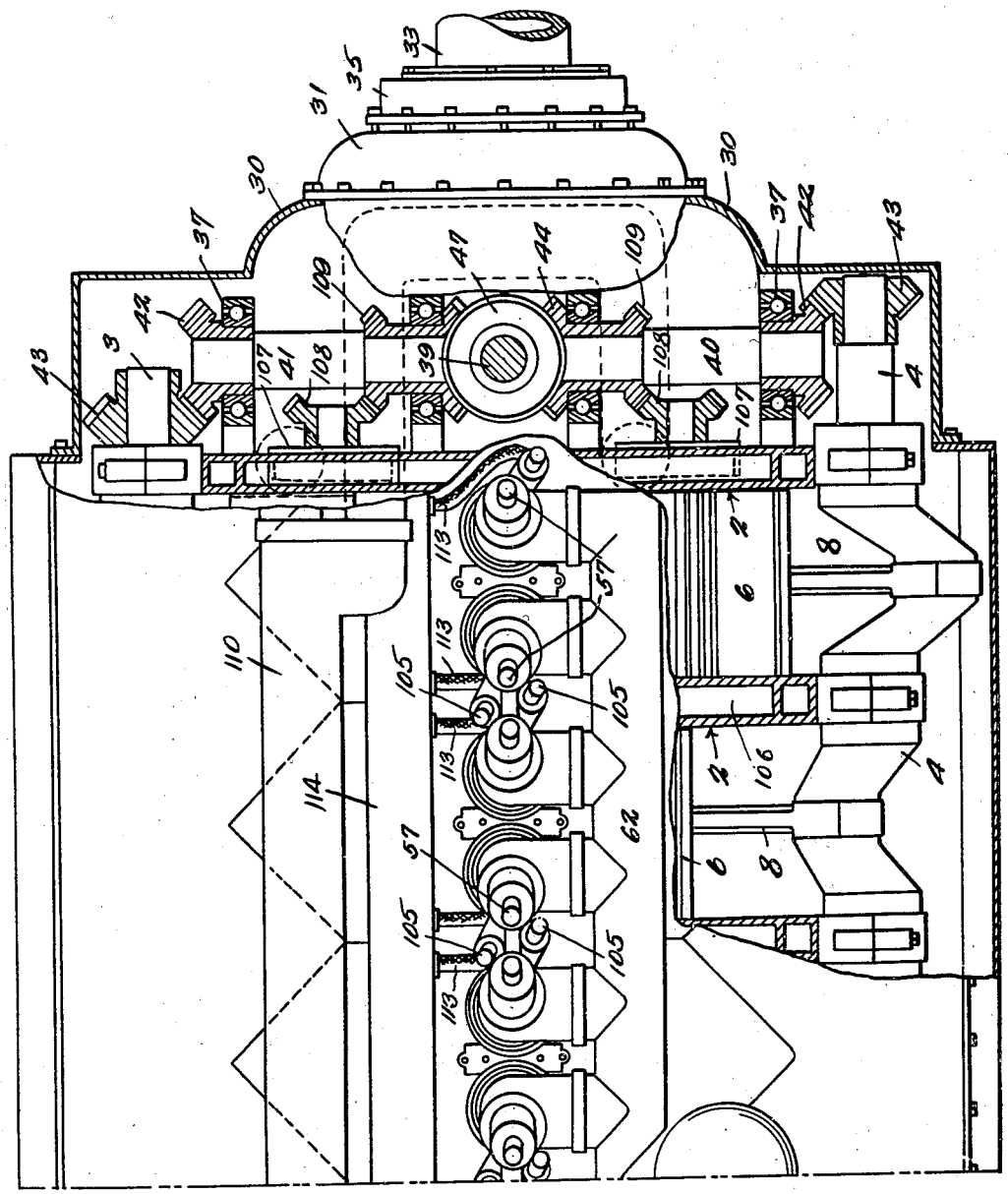

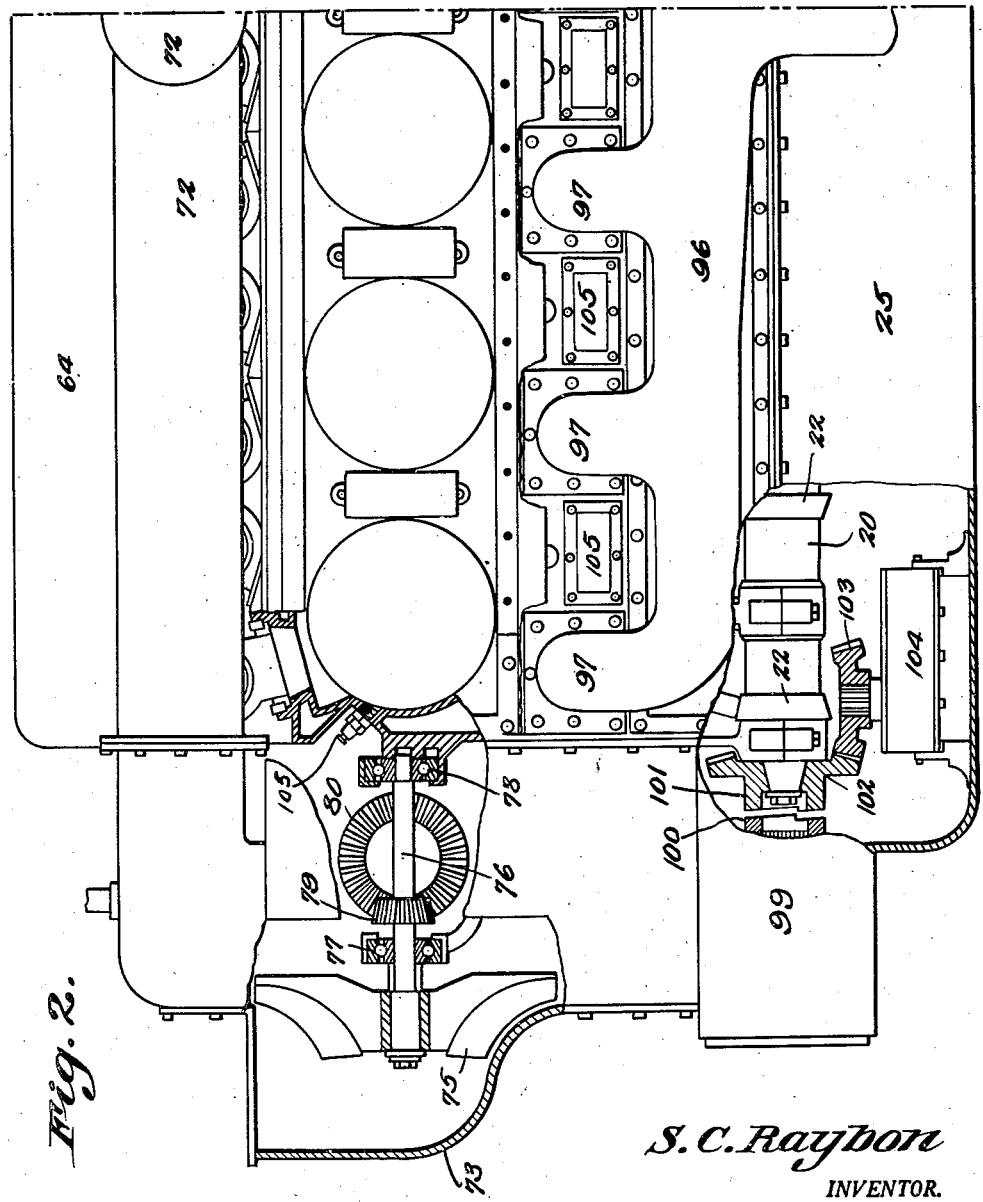

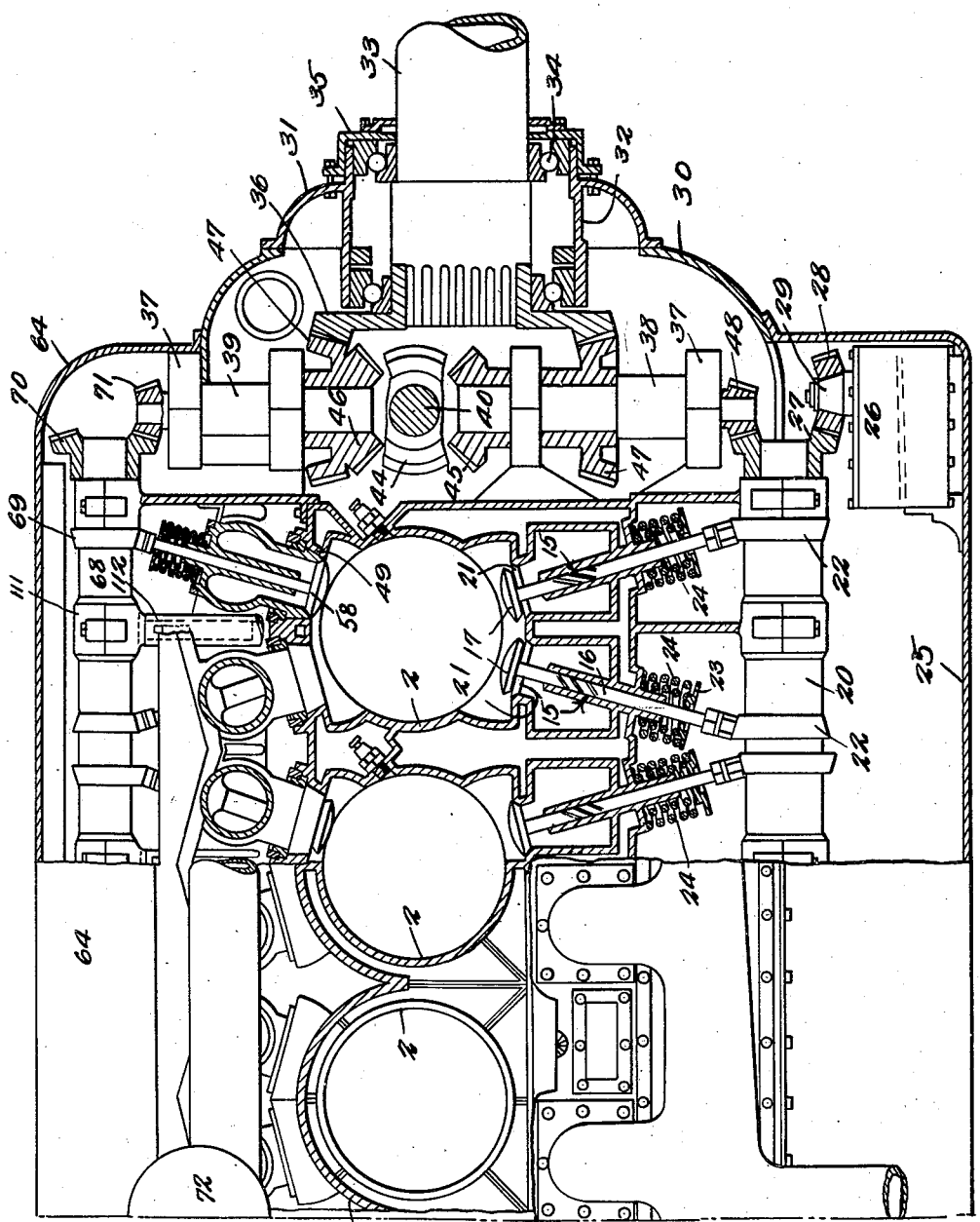

Dec. 11, 1945.    S. C. RAYBON    2,390,960
INTERNAL-COMBUSTION ENGINE
Filed March 16, 1944    7 Sheets-Sheet 5

S. C. Raybon
INVENTOR.

BY
ATTORNEYS.

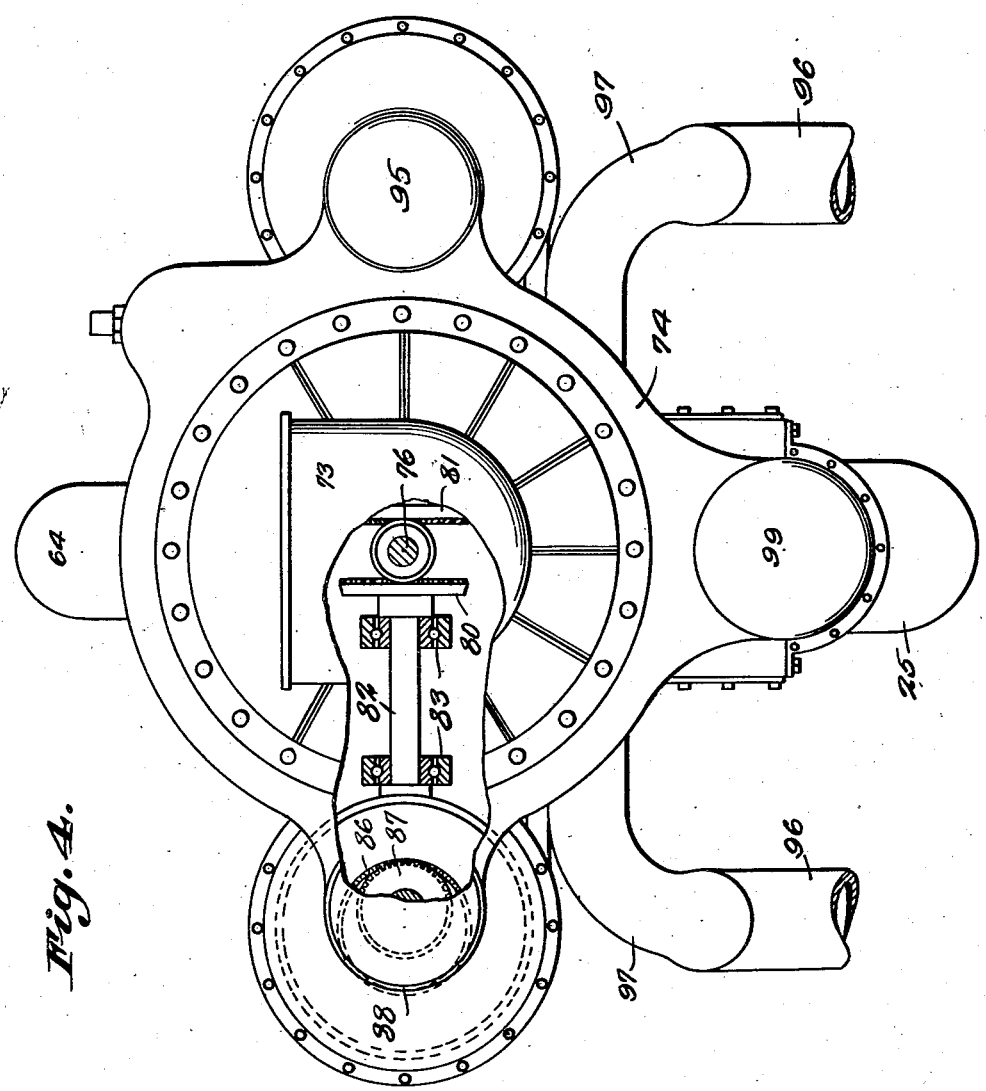

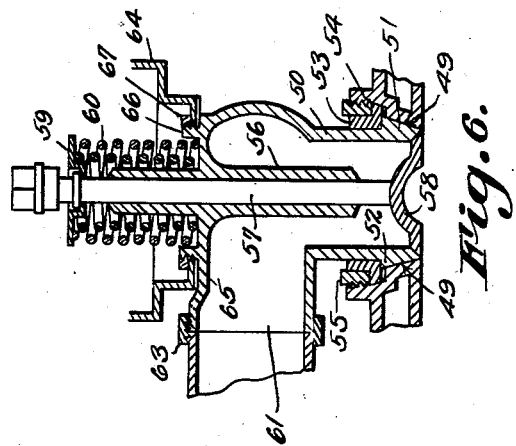

Patented Dec. 11, 1945

2,390,960

UNITED STATES PATENT OFFICE 2,390,960

INTERNAL-COMBUSTION ENGINE

Sidney C. Raybon, Dawson, Ga.

Application March 16, 1944, Serial No. 526,755

2 Claims. (Cl. 123—51)

This invention relates to internal combustion engines of the airplane type and is designed more especially as an improvement upon the structure disclosed in Patent 2,311,254, issued to me on February 16, 1943.

An object of the present invention is to provide the engine with opposed crank-shafts having parallel axes between which are arranged parallel cylinders each providing a single, central combustion chamber whereby opposed pistons operating in the respective end portions of each cylinder, can be actuated by the explosion of a single charge.

A further object is to provide an engine of this type the construction of which is such as to reduce the amount of fuel required for its operation and likewise reduce the cost of production as compared with other engines of the same horsepower.

A still further object is to simplify the construction of engines of this type and correspondingly reduce vibration and prolong the life of the engine.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a view partly in top plan view and partly in section of one end portion of the engine.

Figure 1ª is a view showing the other end of the engine partly in top plan and partly in section.

Figure 2 is a view partly in front elevation and partly in vertical section of one end portion of the engine.

Figure 2ª is a similar view of the other end portion of the engine.

Figure 4 is an elevation of the opposite end portion of the engine, a portion being broken away to illustrate the supercharge housing and a portion of the gearing.

Figure 5 is a horizontal section through a portion of the engine showing the oil drain.

Figure 6 is a section through one of the intake valves.

Figure 7 is a detail view of the split retaining ring used in connection with the removable valve housing.

Figure 1:
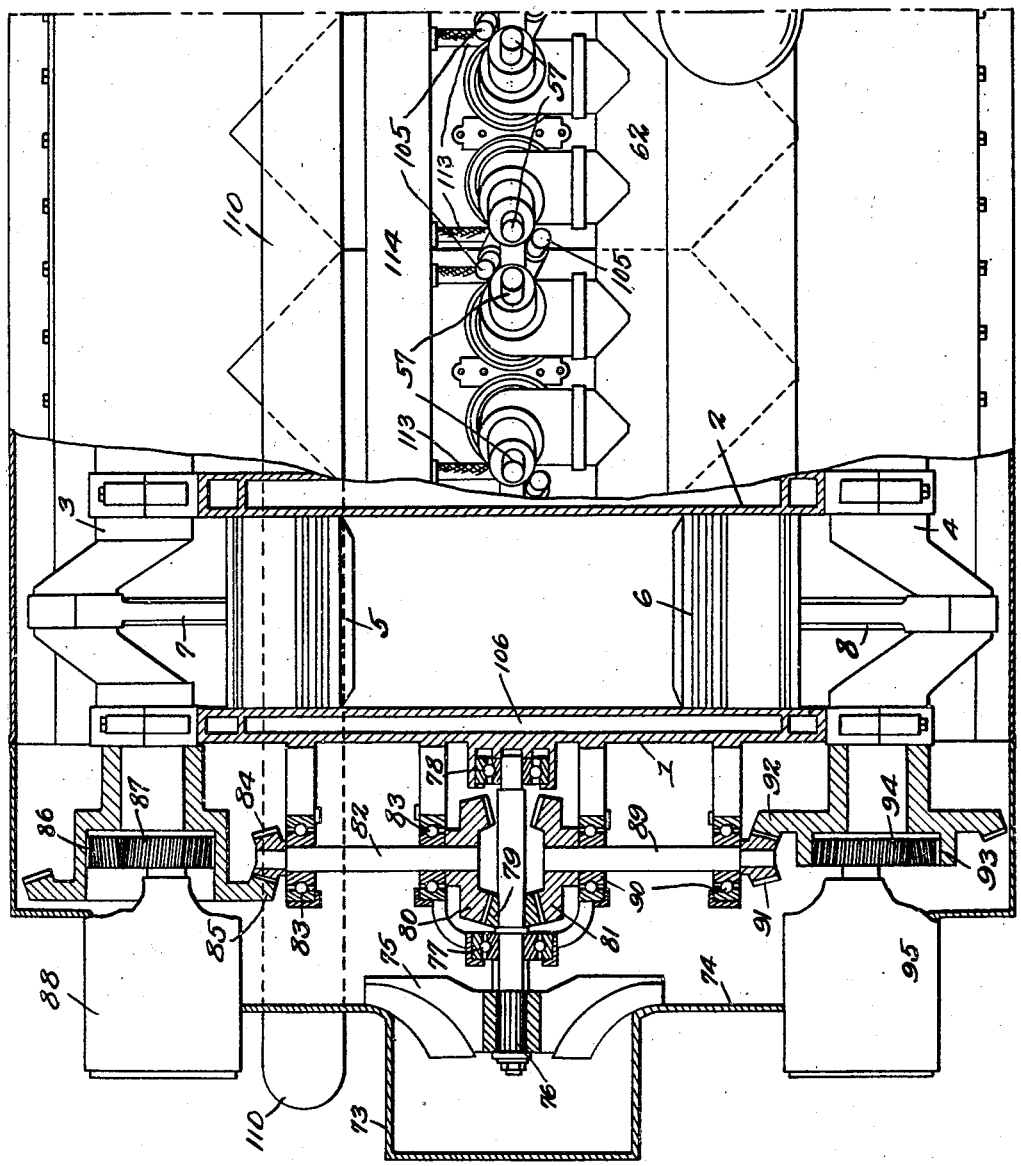
Figure 3:
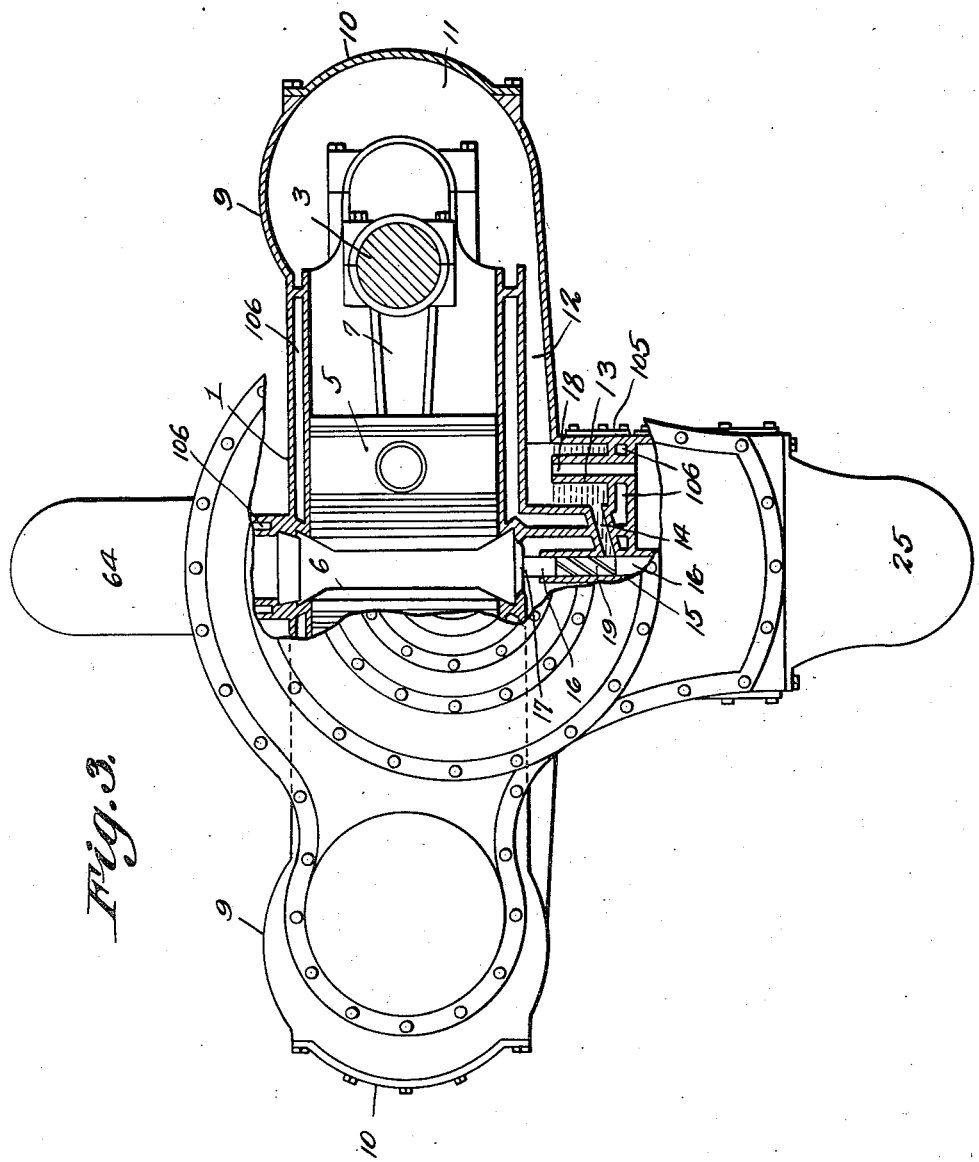
Figure 3 is a view partly in transverse section and partly in end elevation, the section being taken through a portion of one of the combustion chambers and the oil reservoir.

Referring to the figures by characters of reference, 1 designates a cylinder block which can be formed with any desired number of parallel cylinders 2. These cylinders are all of the same size and each cylinder is open at both ends.

The cylinders are located between opposed crank-shafts 3 and 4 the axes of rotation of which are parallel. Each cylinder is also provided with opposed pistons 5 and 6, each piston 5 being connected by an arm 7 to one of the cranks of shaft 3 while each piston 6 is connected by an arm 8 to one of the cranks of shaft 4. The two shafts are adapted to rotate in opposite directions at the same speed and the opposed cranks on the shafts are so arranged that the pistons 5 and 6 in each cylinder will be caused to move toward each other to compress a charge of fuel during approximately one-half a revolution of each shaft and to move away from each other under the action of an exploding charge to complete the rotation of the shafts. The cranks on each shaft are out of line so that compression of charges and the explosion thereof in the respective cylinders will occur in regular succession.

Each side of the cylinder block is provided with an extension 9 forming a portion of the housing for one of the crank-shafts and each of these extensions has a removable plate 10 which, when fastened in position, cooperates with the extension to completely house the crank-shaft. These housings provide chambers 11 for holding a lubricating oil and the chambers communicate through drain passages 12 to oil reservoirs 13 opening through outlets 14 into bores 15 in which are slidably mounted the stems 16 of exhaust valves 17. Each reservoir or well 13 has an overflow nipple extending upwardly thereinto as shown at 18 whereby oil in the well can be maintained at the level of the upper end of the nipple whereas pressure on the oil in the well will force portions of the oil through outlet 14 against the stem of the valve. This stem can be formed with grooves as shown at 19 whereby lubricating oil can be distributed therealong during the operation of the engine.

The valve stems 16 are extended downwardly toward the open bottom of the cylinder block along the central portion of which is located a cam shaft 20.

As shown particularly in Figure 2ª, two exhaust ports 21 are provided for each cylinder 2 and, therefore, two exhaust valves are also provided as shown at 17. The stems 16 of these valves diverge toward the cam shaft and a pair of cams 22 is carried by the shaft for each pair of valve stems. The cams of each pair correspond in shape and size so that both cams will simultaneously unseat the valves associated therewith and permit said valves to become seated simultaneously. A collar 23 is secured to each valve stem (see Fig. 2ª) and receives a thrust from coiled springs 24 as shown so that these springs act to hold the valve stems in operative relation with their cams and urge the valves to their closed positions.

An oil pan 25 closes the open bottom of the cylinder block and can hold an oil pump indicated generally at 26 adapted to be operated by meshing gears one of which, indicated at 27, is secured to and rotates with the cam shaft 20 while the other, indicated at 28, is secured to and rotates with the pump shaft 29.

One end of the cylinder block is provided with a head 30 to which is secured a flange 31 carried by a bearing sleeve 32. A driven shaft 33 is rotatably mounted at one end in the sleeve 32 and is provided with antifriction bearings 34 of any desired construction, there being a slip-on cap 35 detachably secured to flange 31 and closing the outer end of sleeve 32 whereby access to the bearing for adjustment and replacement can be effected readily.

To the inner end of the driven shaft is secured a gear 36 and journalled in suitable bearings provided therefor on the cylinder block and indicated generally at 37 are opposed vertical shafts 38 and 39 respectively and opposed horizontal shafts 40 and 41 respectively. These horizontal shafts are provided at their outer ends with beveled gears 42 in constant mesh with corresponding gears 43 secured to the respective crankshafts 3 and 4. Beveled gears 44 are also secured to the inner ends of shafts 40 and 41 and are in constant mesh with opposed gears 45 and 46 secured to the respective shafts 38 and 39. Additional gears 47 are joined to and rotates with the respective shafts 38 and 39 and mesh constantly with diametrically opposed portions of the gear 36. A gear 48 secured to shaft 38 is in constant mesh with gear 27 so that motion is thus transmitted to the cam shaft 20 controlling the exhaust valves.

Each of the cylinders 2 is provided adjacent to its center and at the top thereof with a pair of exhaust openings 49. As shown particularly in Fig. 6 each of these openings, which is tapered, has wedged in it the tapered end of a removable valve housing 50. Said tapered end 51 has an annular shoulder 52 providing a seat for the opposed members of a split angle-ring 53 adapted to be seated in a recess 54. A screw-threaded ring or collar is insertable into this recess and against the split ring so as to hold the split ring in place and thereby secure the valve housing tightly in the opening 49. This threaded collar has been indicated at 55.

The valve housing 50 has the usual guide stem or sleeve 56 in which is slidably mounted the stem 57 of an exhaust valve 58. A collar 59 is carried by the outer end portion of the stem and is engaged by coiled springs 60 which, by exerting a constant thrust against the collar, serve to hold the valve normally to its seat in the tapered end of the housing 50.

The valve housing 50 has an intake portion 61 in communication with an intake manifold 62 to which it is secured by a coupling ring 63 screwed onto the parts as shown particularly in Fig. 6.

The valve housings 50 are all protected by a housing 64 which can be removably mounted in any manner desired and is provided with openings 65 for the reception of a circular flange 66 on the housing 50 and the outwardly projecting portion of sleeve 56, the springs thereon, and the projecting portion of the valve stem. A ring 67 can be screwed onto the flange 66 for the purpose of holding the housing 50 assembled with the housing 64.

Obviously by removing the ring 67, the housing 64 can be lifted out of place and any one of the valve housings 50 can then be reached for the purpose of moving or repairing it and the parts associated therewith.

Two of the intake valves 58 are provided for each cylinder as before stated and the stems of these valves diverge outwardly toward a cam shaft 68 journalled on the top portion of the cylinder block and covered by the housing 64. This cam shaft is provided with cams 69 arranged in pairs, the cams of each pair acting upon the valve stems of each pair and being similarly disposed so that the valves of each pair will be simultaneously opened or closed when the shaft is rotated. A gear 70 is secured to one end of the shaft 68 and meshes with a gear 71 secured to shaft 39. The gears on the two shafts 38 and 39 and on the cam shafts are so located and proportioned that the shafts will be operated in properly timed relation to open and close the exhaust valves and the intake valves at the proper intervals during the operation of the engine.

The intake manifold 62 is connected through a manifold 72 with a supercharger 73 located in a head 74 closing that end of the engine remote from the driven shaft 33. This supercharger which supplies fuel to the manifolds 62 and 72, includes an impeller 75 secured to a shaft 76 journalled in bearings 77 and 78 and having a gear 79 which, as shown in Fig. 1, meshes with opposed beveled gears 80 and 81. Gear 80 is secured to a counter-shaft 82 journalled in suitable bearings 83 and provided with a gear 84 which, in turn, meshes with a gear 85 secured to and rotating with shaft 3. An internal gear 86 also rotates with the crank-shaft 3 and extends around and meshes with a gear 87 secured to the shaft of a generator 88 mounted in the head 74.

Gear 81 is secured to a counter-shaft 89 mounted in suitable bearings 90 and provided with a gear 91 which meshes with a gear 92 secured to and rotating with the crank-shaft 4. An internal gear 93 also rotates with shaft 4 and extends around and meshes with a gear 94 secured to the shaft of a magneto 95. Thus the rotation of the two crank-shafts serves not only to operate the driven shaft 33 extending from one end of the engine, as heretofore explained, but they also act to drive the supercharge impeller, the generator and the magneto.

It is to be understood of course that the various exhaust ports 21 are in communication with exhaust manifolds 96 through branches 97 leaning from the exhaust chambers 98 of the respective exhaust valves. See Fig. 5.

Located in the bottom portion of the head 74 is a starter 99. The shaft of this starter is alined with the cam shaft 20 as shown in Fig. 2 and is provided with a clutch 100 adapted to be moved into or out of engagement with a clutch member 101 carried by a gear 102 secured to and rotatable with the shaft 20. Another gear 103 meshes with gear 102 and is secured to the shaft of a force pump 104 utilized for forcibly circulating oil through the engine. The oil passages may be located wherever found desirable to conduct the oil from this pump to the various working parts of the engine and back to the pan or container 25 in which the pump is located.

Each cylinder is provided with spark-plugs as indicated at 105 and these can be electrically connected to a suitable ignition circuit including the magneto and generator.

As before stated the two crank-shafts rotate simultaneously in opposite directions respectively and at the same speed. Thus the opposed cranks on the shafts will operate to compress charges successively in the respective cylinders after which the charges will be exploded successively, thereby causing the driven crank-shafts to transmit motion through the reduction gearing to the driven shafts 33 at one end of the engine. At the same time the gearing provided for that purpose will transmit motion to the cam shafts. The cams on these shafts are so positioned relative to each other that the intake valves and the exhaust valves will be actuated in properly timed succession. Fuel is supplied from the supercharger to the various housings of the intake valves by way of manifolds 72 and 62 and the exhaust gases are delivered to the exhaust chambers 98 from which they are discharged into manifold 96 by way of the branches 97.

Importance is attached not only to the particular way in which the housings of the exhaust valves are removably mounted but also to the means for maintaining a lubricant under pressure about the stems of the exhaust valves, this lubricant being provided with overflow means whereby excess lubricant can return freely to the oil pan 25 by way of the nipples 18. The head of the engine, the plates 10, the oil pan, and the collar 64 are all detachably mounted so that access is thus readily afforded to various parts of the engine. In addition thereto other plates can be removably mounted at desired points as indicated, for example, at 105 to afford access to the wells or reservoirs 13 and wherever else it might be deemed advisable to place them.

The various walls of the cylinder block can be made hollow so that the engine can be provided with a circulating cooling medium. These hollow walls have been indicated in the several figures as shown, for example, at 106. For the purpose of effecting circulation of a coolant through the hollow walls of the engine block, there are provided pumps 107 receiving motion through gears 108 from gears 109 rotating with gears 44. These pumps communicate with pipes 110 extended along the top of the block and over the supercharger and opening into the walls of the block at desired points.

It will be noted that the cam shaft 68 is supported in bearings 111 carried by standards 112 connected to the block.

Cables leading to the spark-plugs have been shown at 113 and are extended into a pipe 114 constituting a housing for said wires.

What is claimed is:

1. An internal combustion engine including a cylinder block providing parallel open-ended cylinders, each of said cylinders having intake and exhaust ports adjacent to the center thereof, exhaust valves normally closing the exhaust ports, opposed crank-shafts extending across the respective ends of the cylinders, opposed pistons in each cylinder connected to and operating with the respective crank-shafts, an oil pan extending under the cylinder block, a housing for each crank-shaft, a well positioned to supply lubricant to each exhaust valve, means for directing oil into the wells from the crank-shaft housings by gravity, overflow means in each well for maintaining the oil in the well at a predetermined level; said overflow means being in communication with the oil pan.

2. An internal combustion engine including a cylinder block providing parallel cylinders open at their ends, crank-shafts extending across the respective ends of the cylinders and rotatable about parallel axes, opposed pistons in each of the cylinders operatively connected to the respective crank-shafts and providing a combustion chamber therebetween having intake and exhaust ports, normally closed intake valves, normally closed exhaust valves, opposed cam shafts, cams on one of the shafts in direct engagement with and adapted to actuate the intake valves, cams on the other shafts in direct contact with and positioned to actuate the stems of the exhaust valves, means for transmitting motion between the crank-shafts and the cam shafts, said crank-shafts being rotatable simultaneously in opposite directions and at the same speeds, an oil pan, a plurality of oil reservoirs, means in each reservoir and opening into the oil pan for maintaining oil at a predetermined level in the reservoir, means for directing lubricant into all of the reservoirs, each of said reservoirs having an outlet in communication with one of the exhaust valves, and housings for the crank-shafts constituting oil containers in communication with the last named means.

SIDNEY C. RAYBON.